Aug. 19, 1958     P. A. SIDELL     2,848,676

ELECTRIC MOTOR SPEED REGULATING SYSTEM

Filed April 12, 1957     3 Sheets-Sheet 1

INVENTOR.
P. A. Sidell
BY
Lieber & Lieber
ATTORNEYS.

Aug. 19, 1958  P. A. SIDELL  2,848,676
ELECTRIC MOTOR SPEED REGULATING SYSTEM
Filed April 12, 1957  3 Sheets-Sheet 2

INVENTOR.
P. A. Sidell
BY
Lieber & Lieber
ATTORNEYS.

Aug. 19, 1958  P. A. SIDELL  2,848,676
ELECTRIC MOTOR SPEED REGULATING SYSTEM
Filed April 12, 1957  3 Sheets—Sheet 3

INVENTOR.
P. A. Sidell
BY
Lieber & Lieber
ATTORNEYS.

United States Patent Office 2,848,676
Patented Aug. 19, 1958

2,848,676

ELECTRIC MOTOR SPEED REGULATING SYSTEM

Philip A. Sidell, Wauwatosa, Wis., assignor, by mesne assignments, to Barber-Colman Company, a corporation of Illinois Application April 12, 1957, Serial No. 652,509

7 Claims. (Cl. 318—325)

The present invention relates generally to improvements in the art of controlling the speed of electric motors, and it relates more specifically to improvements in electric motor regulating systems of the type wherein the motor speed is automatically controlled and maintained substantially constant by effective cooperation of the armature pole windings with the commutator segments and with switching means revolvable with the armature.

The primary object of this invention is to provide an improved electric motor speed regulating system which functions to automatically control the motor speed with utmost precision.

Electric motors embodying a different number of armature pole windings and commutator segments, as for example six windings cooperating with three segments, have long been produced; but in these prior motors the armature windings are internally interconnected so as to cause the systems to function as three rather than six pole units, and the provision of the greater number of windings theoretically results only in obtaining better magnetic balance than is possible with a like number of windings and segments, and does not affect the motor speed regulation.

It has also been heretofore proposed to automatically regulate the speed of an electric motor with the aid of a centrifugal switch revolvable with the armature, by providing the latter with a like number of armature pole windings and commutator segments and by permanently disconnecting an end of one of the windings from the adjacent winding and segment, thus constantly eliminating the disconnected winding from the armature energizing circuit. While this type of system may maintain effective dynamic balancing of the armature rotor, it does in fact result in electrical unbalance and necessitates the provision of an extra winding which is devoid of utility with respect to speed control. If this inactive winding is omitted and the rotor is otherwise dynamically balanced, the same electrical unbalancing still results; and if this prior system has the number of armature poles and windings reduced to three, then the motor will fail to start for all relative positions of commutator and brushes.

The present invention therefore provides an improved electric motor speed control system involving a centrifugal switch revolvable with the armature and cooperating with the armature windings and commutator segments to automatically maintain substantially constant speed even during relatively extreme variations in power requirements.

The invention also contemplates the provision of an improved speed control system wherein shunting resistances may be advantageously employed in the motor circuits to vary the governing ranges.

Another important object of this invention is to provide a simple but extremely reliable motor speed regulating assemblage adapted to be embodied in relatively small and compact electric motors especially adapted to propel phonograph turn tables and the like which require precise speed control.

A further important object of the invention is to provide an efficient system for automatically regulating the speed of an electric motor after initial proper installation and adjustment, while maintaining the revolving armature and associated elements dynamically balanced.

Still another important object of my invention is to provide an improved regulator for direct current electric motors of the low voltage type having an armature provided with three or more revolving poles each energized by a winding electrically connected to a commutator having more segments than windings cooperating with a pair of opposed brushes, and wherein the use of slip rings is eliminated.

An additional object of the present invention is to provide an improved electric motor and speed control system comprising few durable parts adapted to be readily produced and assembled to provide a compact rotary propelling unit.

These and other more specific objects and advantages of the invention will be apparent from the following detailed description from which it will be noted that the gist of the improvement is the provision of a speed control system for an electric motor having an armature provided with three or more revolving poles each having an energizing winding electrically connected to a greater number of commutator segments coacting with opposed brushes, and a centrifugal switch interposed between at least one of the windings and an adjacent commutator segment or coil and cooperating therewith to automatically maintain the speed of rotation of the armature substantially constant.

A clear conception of the features constituting the present improvement, and of several embodiments thereof in practical motor speed regulating systems, may be had by referring to the drawings accompanying and forming a part of this specification wherein like reference characters designate the same or similar parts in the various views.

Figure 1:
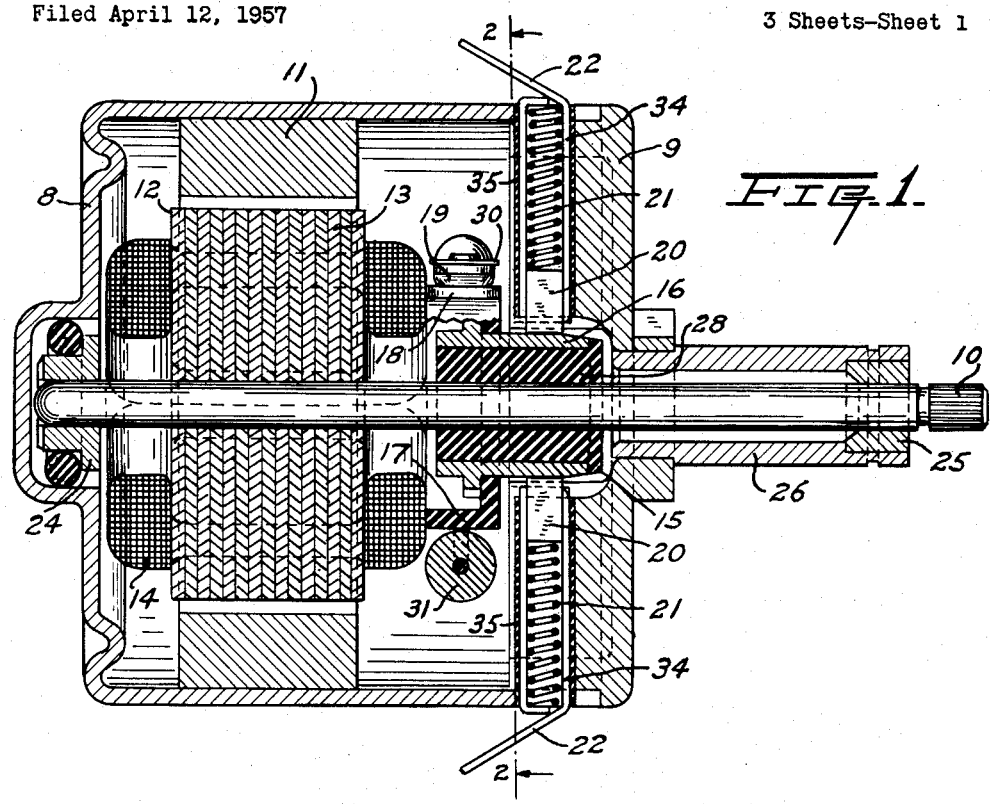
Fig. 1 is a longitudinal central section through a typical commercial electric motor embodying the invention, greatly enlarged.

Although the invention has been shown and described herein as having been embodied in a small direct current electric motor having its field energized by means of permanent magnets while its armature is provided with six revolving poles embraced by windings adapted to be energized by batteries or the like and which are electrically connected to seven commutator segments revolvable with the armature, it is not intended to restrict the use of the improved system of speed control to such a motor; and it is also contemplated that specific descriptive terms employed herein be given the broadest possible interpretation consistent with the disclosure.

Referring to the drawing, the typical improved electric motor shown comprises in general, a main cup-shaped housing 8 having a closure cover 9; a main shaft 10 journalled in the housing 8 and cover 9 and extending outwardly through the cover; an annular fixed and permanently magnetic field piece 11 confined within the housing 8 and surrounding the shaft 10; a rotary armature 12 secured to the shaft 10 and having six radial poles 13 each embraced by an energizing coil or winding 14 and cooperating with the field piece 11; a commutator 15 having seven segments 16 electrically connected to the adjacent ends of the armature windings 14; a centrifugal switch carried by a support 17 which is revolvable with the armature 12, the switch having a fixed contact 18 attached to the support 17 and cooperable with a movable contact 19 also mounted upon the support 17 and being interposed between an end of one winding 14 and an adjacent commutator segment 16; and a pair of diametrically opposed brushes 20 which are constantly urged toward the commutator periphery by coil springs 21 and each of which coacts with a terminal bar 22 adapted to be connected to an outside source of electric energy.

The main housing 8 and the cover 9 are formed of any suitable material such as metal or plastic, and the cover 9 may be detachably secured to the housing 5 in any suitable manner to provide a sealed enclosure for the armature 12, commutator 15, and the centrifugal speed control switch, after these elements have been properly constructed, installed and initially adjusted. The inner end of the shaft 10 may be mounted in a bearing 24 confined within the housing 8 but may also be extended outwardly through the adjacent housing end wall, and the opposite end of the shaft 10 may be mounted in a bearing 25 carried by a sleeve 26 secured to the cover 9 but this end of the shaft 10 may be confined within the cover if the opposite shaft end is utilized for driving purposes. The permanently magnetic field piece 11 may be formed of material such as "Alnico" metal and may be cemented or otherwise firmly secured within the annular wall of the housing 8, see Figs. 1 and 2.

The core of the armature 12 is preferably formed of metal laminations, and is firmly secured to the medial portion of the shaft 10 within the annular field piece 11, and the energizing windings 14 which embrace the armature poles 13 are connected in series while the connections between adjacent pairs of windings 14 are electrically attached to one of the commutator bar segments 16, but the adjacent ends of the first and last coils of the series are attached to separate commutator segments. The arcuate peripheral segments 16 of the commutator 15 are insulated from each other and mounted upon an insulation core 28 which is fastened to the shaft 10, and the switch support 17 is also formed of insulation and is secured to the commutator 15 closely adjacent to the ends of the pole windings 14 so that this support 17 is also revolvable with the armature 12.

Figure 6:
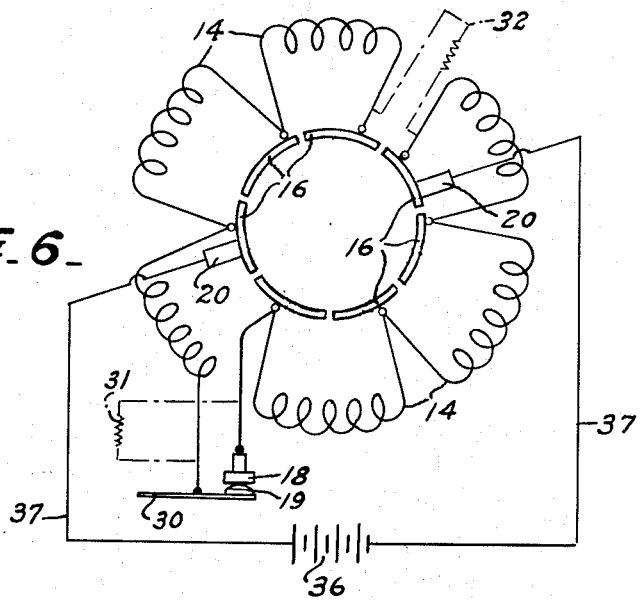
Fig. 6 is a wiring diagram of a complete speed regulating system embodying uniform length commutator segments as in Fig. 5.

The centrifugal switch which is mounted upon and is revolvable with the support 17, is interposed between the inner end and the coil of one of the windings 14, and is preferably located as near as possible midway between the opposite ends of the series of windings 14. The stationary contact 18 of the centrifugal switch is fastened directly to the support 17 while the movable contact is secured to the free end of a cantilever leaf spring 30 the opposite end of which is also fastened to the support 17 so that centrifugal force acting upon the relatively heavy contact 19 will open the switch whereas centripetal force aided by the inward biasing of the spring 30 will close this switch. The wires leading to the switch contacts 18, 19 and the end wires of the first and last windings 14 of the series, may be bridged by resistors 31, 32 respectively as shown in Figs. 4 and 6, for controlling or tailoring the governing range, but these resistors are not essential.

The brushes 20 which are constantly urged into contact with the commutator segments 16 by the helical compression springs 21, are disposed diametrically opposite to each other, and are preferably mounted to slide radially within conductor guides 34 confined in the cover 9 as shown in Fig. 1. These guides 34 are insulated from the cover 9 by protective sheaths 35 and the terminals 22 are formed integral with the adjacent guides 34. The brush terminals 22 are connected to a battery 36 or other suitable source of electric current by conductors 37 as depicted in Figs. 4 and 6, and the improved speed regulating system has been illustrated in motors having six windings 14 cooperating with seven commutator segments 16, but the assemblage shown in Figs. 3 and 4 is what will be designated as a split segment system, while the assemblage shown in Figs. 5 and 6 is what will be designated as the uniform segment system.

Figure 2:
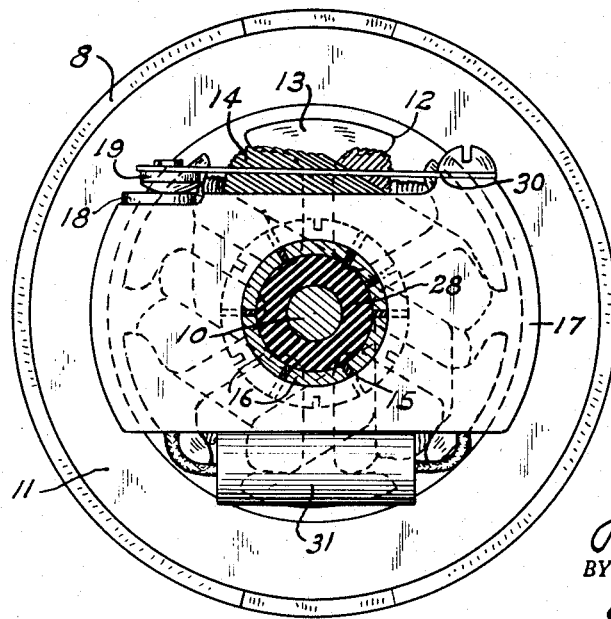
Fig. 2 is a transverse section through the electric motor of Fig. 1, taken along the line 2—2.
Figure 3:
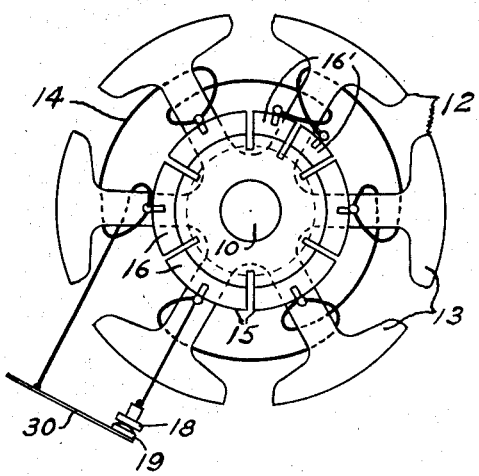
Fig. 3 is a diagram depicting the revolving armature pole, winding, commutator and control switch assemblage of a motor such as illustrated in Figs. 1 and 2, embodying six poles and seven commutator segments of which five are of equal length while a sixth is split into two equal parts.
Figure 4:
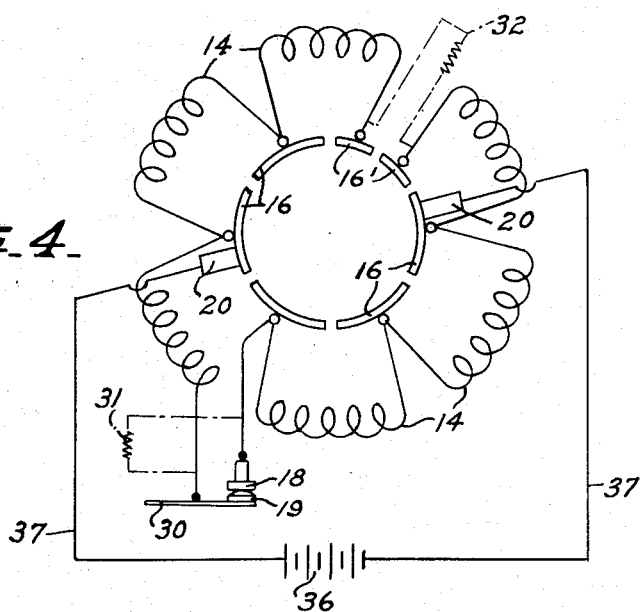
Fig. 4 is a wiring diagram of a complete speed regulating system embodying a split commutator segment as in Fig. 3.
Figure 5:
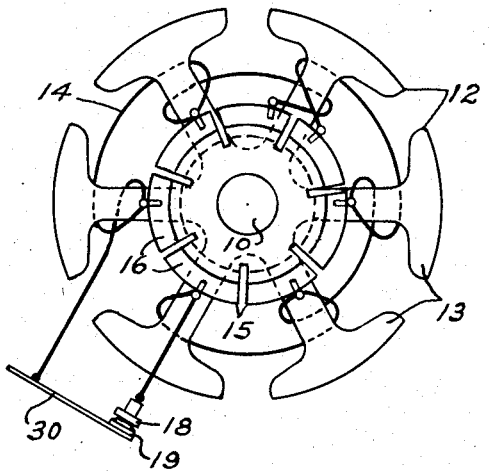
Fig. 5 is another diagram similar to that of Fig. 3 but embodying six poles and windings cooperating with seven commutator segments of equal or uniform length.

Referring specifically to the split segment system illustrated in Fig. 2 and the diagrams of Figs. 3 and 4, it will be noted that five of the commutator segments 16 are of equal length measured circumferentially of the commutator, while the sixth segment 16 is split into two equal parts. The adjacent ends of the first and last winding 14 of the series are connected respectively to these two halves of the split segment 16', and while this system has six windings 14 and effective poles 13, it does in fact have seven separate commutator bars or segments 16, 16' cooperating with these windings and poles so as to dynamically balance the armature.

With this split segment system, when the governing switch is closed, there is only one path for the current to flow through the successive armature windings 14, and the size of the wire and the number of turns in these windings is determined by the desired characteristics of the motor. As previously indicated the centrifugal switch should also be associated as near as possible with the middle of the series of windings 14. When this switch is within the circuit and is open, no current will flow through the windings 14 if an odd number of effective poles is provided, therefore there is no position during rotation of the armature at which the governing switch is not in the circuit, but if the switch is open no current will flow through the windings at any time. With the present improved system embodying an even number of effective poles, there are always two zones during each revolution at which current can flow through the single path even when the control switch is open, and these two zones will vary in width according to the number of effective poles.

For example, in a six pole motor current can flow through the windings 14 not including the winding embodying the governing switch, at two points during each revolution, or one-sixth of the revolution. The switch therefore functions theoretically during a major portion of the rotation to prevent current from flowing through the armature. If the same motor is utilized without the split segment 16', but having a full segment 16 instead and with its windings full ring connected in the usual manner, and also embodying a single governing switch, then opening of the switch merely cuts out one path of flow for the current, allowing the other path to remain intact and thereby reducing the governing effect to a very slight amount unless the load is high, and even then this effect is considerably less than with the present split segment system.

The advantage of this split segment system is that the commutator segments 16, 16' can all be placed in proper relationship with respect to the effective poles 13 in order to obtain the perfect timing, and the effect of the split is to reverse the path of flow of the current to windings 14 which would not be otherwise utilized. Just before one brush 20 reaches the split segments 16' the current is flowing through the windings 14 which are interposed between the full segment 16 nearest the split and the segment 14 which is engaged by the other brush 20, as in Fig. 4. When the commutator passes the split segment 16', current no longer flows through this path, but it does flow through the other set of windings 14 which are wound so that the same polarities result, and the splitting of the winding 16' therefore has no detrimental electrical effect other than that only a portion of the windings 14 are effective at all times.

Referring especially to the uniform segment system illustrated in the diagrams of Figs. 5 and 6, in this system the six windings 14 cooperate with seven commutator segments 16 of equal length measured circumferentially of the commutator. The individual windings 14 are connected in series, and the ends of the successive windings 14 are directly connected to the adjacent successive segments 16 but the extreme ends of the final windings 14 of the series are connected to segments 14 which are not directly connected to any of the intermediate windings. The governing switch is preferably interposed as near as possible within the mid-portion of the winding series diametrically opposite to the open end of this series.

With such modification if an even number of effective poles 13 and windings 14 are utilized as in Figs. 5 and 6, the current can flow through the armature windings during the portion of each revolution that half of the commutator is connected to the battery 36 by the diametrically opposed brushes 20. By utilizing six effective poles 13 and windings 14 with seven commutator segments, the motor will function twice during each rotation for approximately thirty degrees, and will therefore be obtaining power during approximately one-sixth of every revolution. This same result is obtainable by varying the number of poles and windings and by providing one more commutator segments than the number of windings, but it is preferable to utilize at least four poles and five segments in order to obtain satisfactory timing.

While the split segment system is perhaps more advantageous in obtaining proper timing, it has the objection of requiring commutator segments 16, 16' of different sizes or widths thus making it more difficult to assemble small commutators. Both the uniform and split segment systems operate in similar manner, the difference being in individual timing of the poles as the motor rotates throughout the revolution. With the split system all poles are timed the same with respect to the magnetic flux, while the timing of the poles in the uniform commutator system varies with respect to the start of the winding series 14. This timing variation decreases as the number of poles is increased. In both systems the armatures may be readily balanced to insure smooth rotation and to avoid undesirable vibration. They thus obtain more accurate and precise speed regulation at all times, and with either system the number of effective poles and windings may be varied but in all cases the number of commutator segments must be greater by one than the number of effective poles.

The advantages of utilizing the resistors 31 and 32 are as follows:

Resistance 31 is used to adjust the high voltage end of the governed range. Decreasing the value of the resistance lowers the voltage at which the motor no longer controls when this is desirable for the application. It also reduces the difference in torque pulses between governor open and governor closed when this is desirable.

Resistance 32 when decreased lowers the voltage at which the governing starts where this is desirable in the application, permitting lower overall effective armature resistance without the disadvantage of a completely closed ring that would inordinately reduce the governing effect as occurs in prior art with one governor.

The improved system can be advantageously used in electric motors having either permanent or electrically energized magnetic fields either series, shunt or compound connected, and the invention has proven highly satisfactory and successful in actual use in automatically maintaining substantially constant speed under varying loads. While the present description involves a motor wherein brush bridging of adjacent commutator bars has not been specifically described, such bridging does not in fact mitigate the advantages of the invention.

It should be understood that it is not desired to limit this invention to the exact details of the speed control systems herein specifically shown and described, for various modifications within the scope of the appended claims may occur to persons skilled in the art.

I claim:

1. In an electric motor speed regulating system, a rotary armature having at least three effective poles angularly spaced equal distances around the armature and each provided with an energizing winding, said armature also having a commutator provided with one more segment than the number of poles and windings, said windings being connected in series with two adjacent windings disconnected from each other and having their disconnected ends each attached to one of said segments while the interconnected ends of the successive windings of the series are attached to the other segments, a centrifugal switch interposed between two adjacent windings of said series remote from said disconnected windings, commutator brushes connected to a source of electrical energy and coacting with said segments, and a magnetic field cooperating with said poles to rotate said armature.

2. In an electric motor speed regulating system, a rotary armature having at least three uniformly spaced effective poles each provided with an energizing winding and also having a commutator provided with one more segment than the number of poles and windings, said windings being connected in series with two adjacent windings disconnected from each other and having their disconnected ends each attached to one of said segments while the interconnected ends of the successive windings of the series are attached to the other segments, a centrifugal switch interposed between two adjacent windings of said series diametrically opposite to the disconnected ends of said winding series, a pair of diametrically opposed brushes connected to a source of electrical energy and coacting with the diametrically opposite commutator segments, and a magnetic field cooperating with said poles to rotate said armature.

3. In an electric motor speed regulating system, a rotary armature having at least three effective poles each provided with an energizing winding and also having a commutator provided with one more segment than the number of poles and windings, said windings being connected in series with two adjacent windings disconnected from each other and having their disconnected ends each attached to one of said segments while the interconnected ends of the successive windings of the series are attached to the other segments, a centrifugal switch interposed between two adjacent windings of said series remote from said disconnected windings, commutator brushes connected to a source of electrical energy and coacting with said segments, a magnetic field cooperating with said poles to rotate said armature, and a resistance interposed between the adjacent ends of the end windings of the series.

4. In an electric motor speed regulating system, a rotary armature having at least three effective poles each provided with an energizing winding and also having a commutator provided with one more segment than the number of poles and windings, said windings being connected in series with two adjacent windings disconnected from each other and having their disconnected ends each attached to one of said segments while the interconnected ends of the successive windings of the series are attached to the other segments, a centrifugal switch interposed between two adjacent windings of said series remote from said disconnected windings, commutator brushes connected to a source of electrical energy and coacting with said segments, a magnetic field cooperating with said poles to rotate said armature, and a resistance interposed between the contacts of said centrifugal switch.

5. In an electric motor speed regulating system, a rotary armature having at least three effective poles each provided with an energizing winding and also having a commutator provided with one more segment than the number of poles and windings, two adjacent of said segments being of approximately one half of the effective width of each of the remaining segments and said windings being connected in series with two adjacent windings disconnected from each other and having their disconnected ends each directly attached to one of said two narrower segments while the interconnected ends of the successive windings of the series are directly attached to the adjacent wider segments, a centrifugal switch interposed between adjacent medial windings of said series remote from said disconnected windings, brushes connected to a source of electric current and coacting with said segments, and a magnetic field cooperating with said poles to rotate the armature.

6. In an electric motor speed regulating system, a rotary armature having at least three effective poles each provided with an energizing winding and also having a commutator provided with one more segment than the number of poles and windings, two adjacent of said segments being of approximately one half of the effective width of each of the remaining segments and said windings being connected in series with two adjacent windings disconnected from each other and having their disconnected ends each directly attached to one of said two narrower segments while the interconnected ends of the successive windings of the series are directly attached to the adjacent wider segments, a centrifugal switch interposed between adjacent medial windings of said series remote from said disconnected windings, brushes connected to a source of electric current and coacting with said segments, a magnetic field cooperating with said poles to rotate the armature, and a resistance interposed between the adjacent ends of the end windings of the series.

7. In an electric motor speed regulating system, a rotary armature having at least three effective poles each provided with an energizing winding and also having a commutator provided with one more segment than the number of poles and windings, two adjacent of said segments being of approximately one half of the effective width of each of the remaining segments and said windings being connected in series with two adjacent windings disconnected from each other and having their disconnected ends each directly attached to one of said two narrower segments while the interconnected ends of the successive windings of the series are directly attached to the adjacent wider segments, a centrifugal switch interposed between adjacent medial windings of said series remote from said disconnected windings, brushes connected to a source of electric current and coacting with said segments, a magnetic field cooperating with said poles to rotate the armature, and a resistance interposed between the contacts of said centrifugal switch.

No references cited.